United States Patent [19]

Gifford et al.

[11] Patent Number: 4,944,825

[45] Date of Patent: Jul. 31, 1990

[54] LABELING APPARATUS

[75] Inventors: Eric P. Gifford, Chagrin Falls; William J. Roblin, North Royalton, both of Ohio

[73] Assignee: Automated Packaging Systems, Inc., Twinsburg, Ohio

[21] Appl. No.: 264,443

[22] Filed: Oct. 28, 1988

[51] Int. Cl.[5] .............. B32B 31/00

[52] U.S. Cl. .............. 156/294; 53/291; 53/585; 156/86; 156/556; 156/566

[58] Field of Search .............. 53/291, 292, 295–297, 53/300, 585; 198/345, 463.4, 479.1; 156/566–568, 556, 294, 86

[56] References Cited

U.S. PATENT DOCUMENTS

| | | | |
|---|---|---|---|
| 2,262,799 | 11/1941 | Everett . | |
| 2,914,894 | 12/1959 | Hansen | 53/292 X |
| 2,987,313 | 6/1961 | Bjering et al. | 53/300 X |
| 4,108,705 | 8/1978 | Hadl et al. . | |
| 4,412,876 | 11/1983 | Lerner et al. . | |
| 4,467,909 | 8/1984 | Jörss . | |
| 4,473,429 | 9/1984 | Crankshaw . | |
| 4,565,592 | 1/1986 | Wehrmann et al. . | |
| 4,620,888 | 11/1986 | Easter et al. . | |
| 4,697,691 | 10/1987 | Zodrow et al. . | |

*Primary Examiner*—David Simmons
*Attorney, Agent, or Firm*—Watts, Hoffmann Fisher & Heinke

[57] ABSTRACT

Apparatus and method for applying tubular labels to empty or filled product containers at a labeling station including a reciprocally moveable labeling assembly and a container advancing mechanism including a pair of confronting, rotatable star wheels. The star wheels include arms for engaging and holding a container to be labeled at a label applying position. The star wheels operate to stabilize the container until the labeling applying assembly engages the container. The star wheels then move out of the labeling station to provide clearance for the label applying assembly. A cam drive system is utilized to both reciprocate the label applying assembly and the star wheel mechanism. Sensors monitor torque in the star wheels and terminate operation should excessive torque be encountered. An additional star wheel and associated guide are used to advance a container from either an inline or side conveyor to a container presenting position. Movement and/or position of the guide is monitored by a detent mechanism which releases the guide should a jam occur. Movement of the guide causes termination of apparatus operation.

15 Claims, 9 Drawing Sheets

LABELING APPARATUS

TECHNICAL FIELD

The present invention relates generally to apparatus and methods for labeling products and in particular to an apparatus and method for applying flexible, tubular labels to product containers.

BACKGROUND ART

The labeling of product containers, such as bottles, can be done by various methods. Early methods involved either printing information directly onto the container or alternately printing the information on a label which was then adhesively bonded to the container.

A more recent labeling method involves the application of a tubular, flexible label to the bottle. Typically, the label is preprinted with the product's name and product information and the label is then pulled over the container either manually or by machine.

The use of tubular, flexible labels have become a common way of labeling plastic, "2 liter" bottles which are popular containers for soft drinks. In general, these plastic containers are replacing glass bottles and metal cans more and more each year. The labeling of these types of containers can be time consuming and add significant cost to the product package.

Apparatus and methods for automatically placing tubular labels on product containers have been suggested. In U.S. Pat. Nos. 4,412,876 issued Nov. 1, 1983 and 4,620,888 issued Nov. 4, 1986 both owned by the present assignee, relatively high speed label applying machines are disclosed. The labeling apparatus and label applying methods described in these patents have become commercially successful and are used by soft drink bottling companies, among others.

The machines described in the two above-identified patents, were designed to label empty containers or bottles. Recently it has been found desirable to fill the bottles prior to labeling. It was found that the machines of the above-identified patents could not handle the labeling of filled bottles as effectively as desired. It must be recognized that the contents of the bottle adds considerable mass and as a result filled bottles require different handling procedures and mechanisms in order to convey the filled bottle through a labeling apparatus at the high speeds bottlers have come to expect.

DISCLOSURE OF THE INVENTION

The present invention provides a new and improved apparatus and method for applying tubular, flexible labels to product containers such as plastic soft drink bottles. The disclosed apparatus is capable of high speed operation and can install labels reliably onto bottles or containers that are empty or filled.

According to the preferred and illustrated embodiment, the labeling apparatus includes a frame structure defining a work station; a labeling assembly forming part of the work station that is operative to apply a label to a product container positioned in alignment with the assembly; a drive system for actuating the labeling assembly and a container advancing mechanism capable of sequentially advancing filled (or empty) product containers to a label applying position. In the preferred and illustrated embodiment, the advancing mechanism also operates to stabilize the product container for at least a portion of the labeling cycle to inhibit the container from moving out of alignment with the labeling assembly.

In the preferred and illustrated embodiment, the labeling assembly and frame structure are similar to that disclosed in U.S. Pat. Nos. 4,620,888 and 4,412,876, both of which are hereby incorporated by reference. The labeling assembly is driven through a label applying stroke and a return stroke. During the label applying stroke a label is pulled onto the product container and severed from the supply (which is usually in the form of a web defined by a chain of labels interconnected by lines of weakness i.e. perforations). Near the end of the label applying stroke, the label assembly releases the label and then is retracted to allow the labeled container i.e. bottle, to exit the work station and to allow an unlabeled container or bottle to advance into the work station. The next label to be applied is engaged just prior to beginning the label applying stroke. The initial position of the next label to be applied may be adjusted by the apparatus shown in U.S. Pat. No. 4,565,592 or the apparatus shown in co-pending application Ser. No. 07/264,432, filed Oct. 28, 1988, both of which are hereby incorporated by reference.

The drive system for actuating the labeling assembly may be in the form of a crank mechanism rotated by a drive motor as shown in U.S. Pat. No. 4,412,876 or a cam/cam follower mechanism shown in U.S. Pat. No. 4,620,888.

According to the invention, the bottle advancing mechanism is capable of sequentially advancing filled (or empty) product containers such as "two liter" bottles to a label applying position. To facilitate the explanation, the invention will be described in connection with a bottle labeling application. It should be understood that the invention is adaptable to a wide variety of product labeling applications. In the preferred embodiment, the advancing mechanism includes a conveyor arrangement for conveying bottles from a remote location to a bottle presenting position at the labeling apparatus. Bottle engaging members are periodically activated to engage and advance a container to the label applying position defined at the work station. The product engaging members drive a labeled bottle out of the label applying position as the next bottle is advanced from the bottle presenting position.

According to a feature of the invention, the product engaging members also operate to stabilize the product container for at least a portion of the label applying cycle so that the container does not move out of alignment with the label applying assembly.

In the exemplary embodiment, the product engaging members comprise a pair of confronting, rotatable star wheels which are co-rotated to advance a bottle from the bottle presenting position to the bottle labeling position. During the labeling process, the bottle to which the label is being applied is located between confronting container engaging elements (such as arms) of the star wheels which together define a pocket.

According to a feature of the invention, the star wheels are reciprocally mounted and move out of the label applying station as the label is being applied by the label applying assembly. In the preferred embodiment, movement in the star wheels does not commence until the label applying assembly initially engages the product container so that the container is at least partially stabilized throughout the label applying cycle by either the star wheels or the label applying assembly.

Preferably a cam arrangement is used to both reciprocate the label applying assembly and the star wheels. The cams are preferably designed such that once movement in the star wheels commences, both the label applying assembly and star wheels move in unison, although initial movement in the star wheels is delayed until the label applying assembly reaches a predetermined position.

To achieve this feature the star wheels are mounted on elongate shafts which are supported for reciprocating, sliding movement in bearing members forming part of a star wheel transmission. With the disclosed arrangement, the transmission for driving the members remains stationary even though the star wheels reciprocate towards and away from the labeling station.

According to another feature of the invention, a torque sensor forms part of the star wheel drive and is operative to terminate operation of the machine should excessive torque be sensed in driving the star wheels which is normally precipitated by a jam or other malfunction.

According to another feature of the invention, an infeed member which in the preferred embodiment comprises another star wheel, is positioned upstream of the paired star wheels and is operative to move a product container from an entry conveyor to a position at which the paired star wheels can engage the container or bottle. The infeed star wheel operates in conjunction with a guide arm which confines and guides the bottle between bottle engaging arms defined by the infeed star wheel and the guide arm.

According to a feature of this embodiment, the guide arm is held in its operative position by a detent mechanism including a sensor. In the event of a malfunction, i.e., jam, the detent releases the guide arm. The release of the guide arm is sensed by the sensor which then operates to shut down the labeling apparatus.

According to another feature of the invention, the guide arm and star wheel are adapted to receive bottles from conveyors located at different positions. In the disclosed embodiment, the infeed star wheel and guide arm can be adjusted to receive bottles from a conveyor having a longitudinal axis perpendicular to the direction of movement of the bottle into the work station as well as a conveyor having a longitudinal axis parallel to the direction of movement of the bottle into the work station. In the disclosed embodiment, the change from one conveyor to another is achieved by replacing the guide arm with one having a different arc length.

With the present invention, filled product containers such as two-liter bottles can be efficiently and reliably labeled at high speeds. The disclosed advancing mechanism maintains stability of the product throughout the labeling cycle so that misalignments between the product being labeled and the label applying assembly are minimized.

Additional features of the invention will become apparent and a fuller understanding obtained by reading the following detailed description made in connection with the accompanying drawings.

BEST MODE FOR CARRYING OUT THE INVENTION

Figure 1:
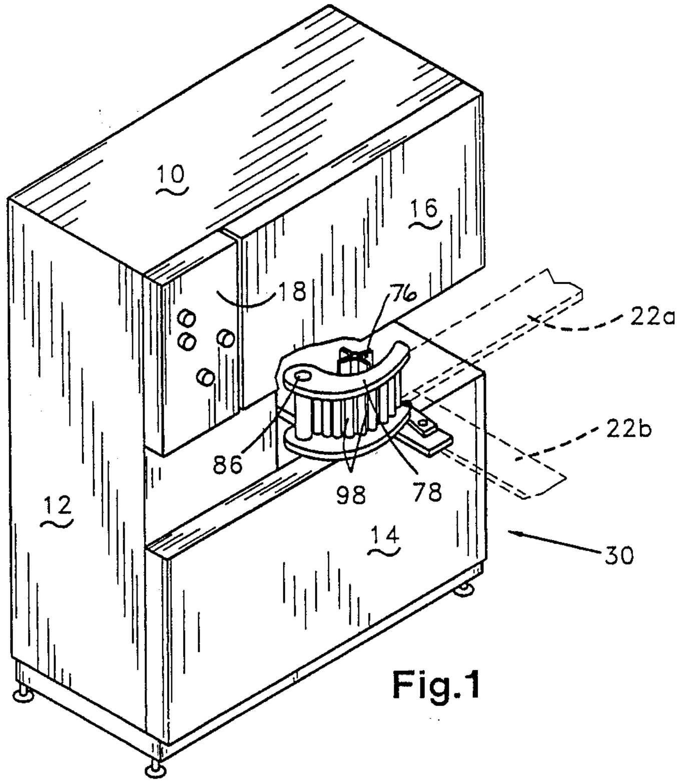
FIG. 1 is a perspective view of a labeling apparatus constructed in accordance with the preferred embodiment of the invention.

FIG. 1 illustrates the external appearance of a labeling apparatus constructed in accordance with the preferred embodiment of the invention. The labeling apparatus includes a sheet metal cabinet formed by a plurality of removable covers 10, 12, 14, 16. The control panel 18 contains a plurality of operator controls for controlling the operation of the apparatus. The disclosed labeling apparatus is adapted to apply tubular, flexible labels to either empty or filled containers such as "2-liter" soft drink bottles. The bottles 20 are brought to the machine on one of two conveyors, indicated by the reference characters *22a*, *22b*.

Figure 2:
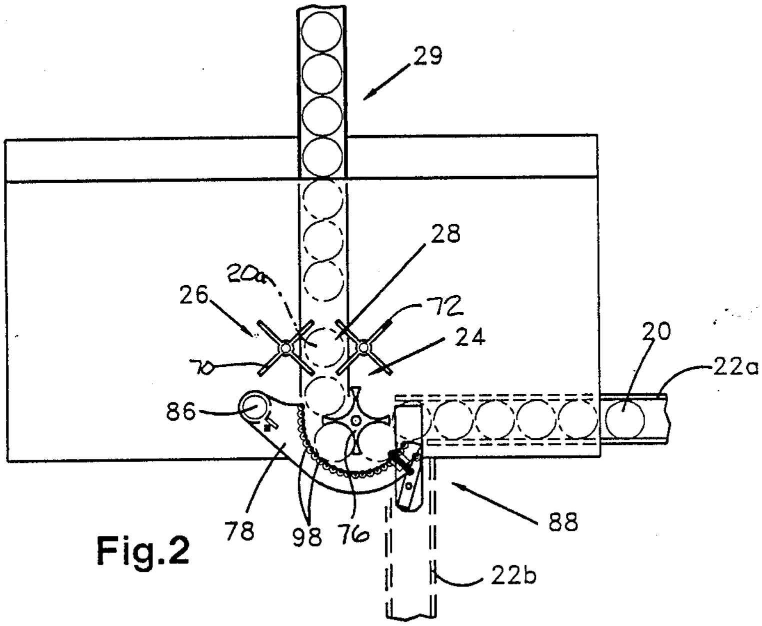
FIG. 2 is a plan view of the labeling apparatus shown in FIG. 1.
Figure 3:
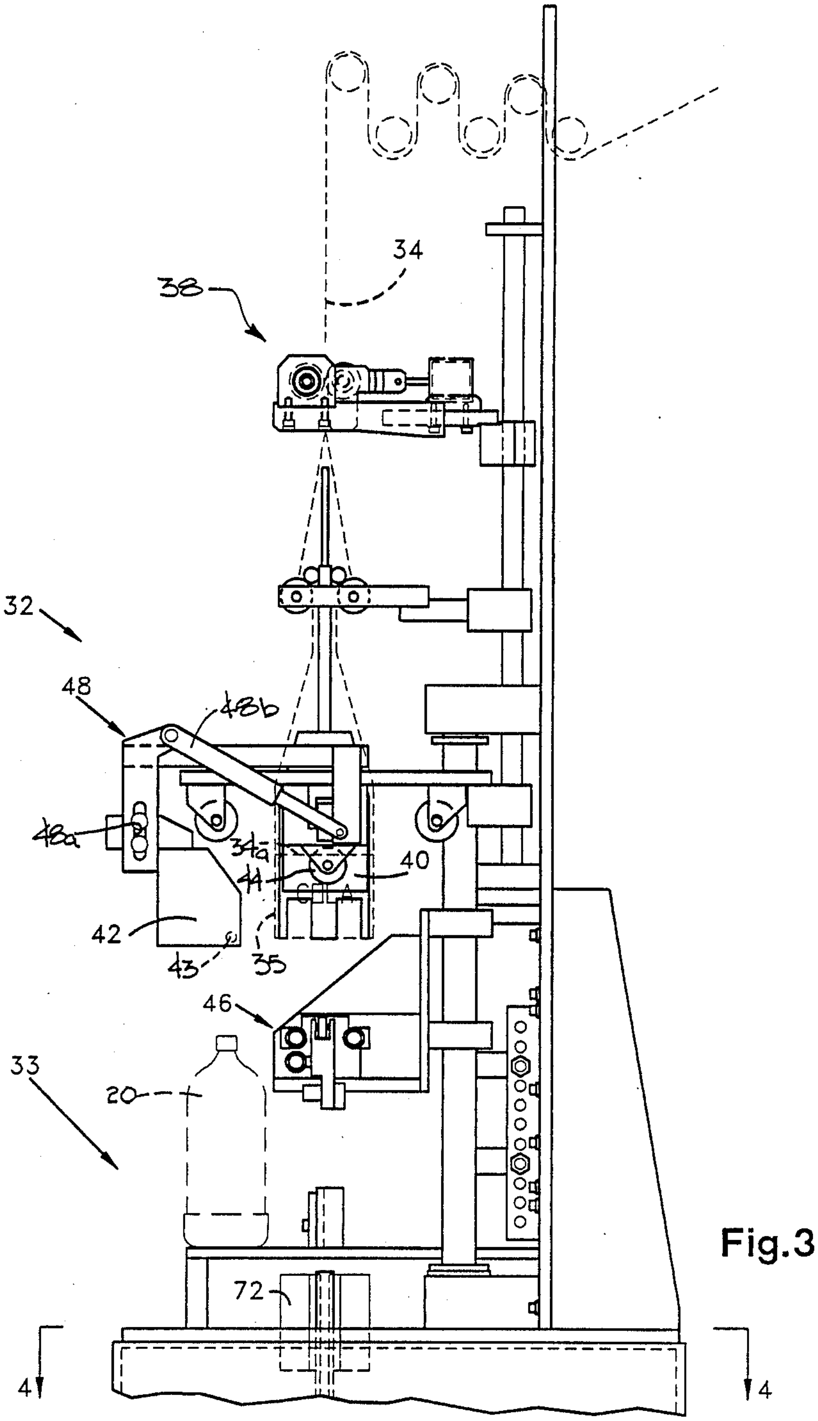
FIG. 3 is a fragmentary, side elevational view of the apparatus with exterior covers removed to show interior detail.

A conveyor arrangement including one of the conveyors *22a*, *22b* brings the bottles 20 to a bottle presenting position indicated generally by the reference character 24. With the bottle in this position, a bottle advancing mechanism indicated generally by the reference character 26 is operative to engage a bottle located at the label presenting position 24 and move it into a label applying position indicated generally by the reference character 28. Referring also to FIG. 2, after it is labeled, the bottle is advanced out of the labeling position 28 by the product advancing mechanism 26 and onto an exit conveyor assembly 29 that carries the labeled bottles from the exit of the labeling apparatus.

Referring also to FIGS. 3–7, some of the internal construction of the labeling apparatus is illustrated. A base or lower portion 30 of the apparatus supports and mounts a drive system constructed in accordance with the preferred embodiment of the invention. An upper portion 32 defines the labeling station indicated generally by the reference character 33. The upper portion 32 includes a supply of labels (not shown) preferably comprising a continuous tubular web 34 wound on a supply spindle (not shown), each individual label being defined by a pair of longitudinally spaced, transverse perforations *34a*. As is fully disclosed in U.S. Pat. Nos. 4,142,876 and 4,620,888, the web of the labels is fed over a mandrel 40 (shown only in FIGS. 3 and 5) and then pulled over a product container *20a* (shown in FIG. 2) positioned below the mandrel 40. During the application process the label being applied is severed from the web 34 along the line of weakness *34a*.

The labeling station 33 is preferably similar in construction to the label assembly shown in U.S. Pat. No. 4,620,888. The labeling station 33 includes a label position detector 42 and web braking devices 44. The detector 42 and other associated parts are omitted from FIG. 5 in order to illustrate the details of the mandrel 40 and other related components. In the disclosed embodiment, the web braking device 44 comprises a solenoid operated plunger 44a (shown in FIG. 5) which when actuated clamps the web against the stationary mandrel 40 so that as the endmost label is pulled downwardly by a label applying assembly 46, the endmost label is severed from the remainder of the web along the label defining perforations 34a. The web position detector 42 senses the position of the label on the mandrel and energizes the web braking mechanism to clamp the web so that further movement in the endmost label causes severance along the line of weakness 34a. In addition, the web sensor also senses the leading edge of the "next-to-be-applied" label and adjusts its overall position with respect to the labeling station to ensure proper positioning of the label on the next container. The positioning device may comprise the apparatus disclosed in U.S. Pat. No. 4,565,592 or a web positioner apparatus 38 disclosed in co-pending application Ser. No. 07/264,432, filed Oct. 28, 1988. A sensor 43 forming part of the detector 42 may be used to monitor the leading edge of the endmost label 35.

The detector 42 is adjustably supported relative to the labeling station by a support assembly 48. The support assembly 48 includes slots 48a and link arm 48b by which the assembly is connected to the frame of the machine and which enables the support assembly to be adjustably positioned vertically and laterally as desired.

Figure 5:
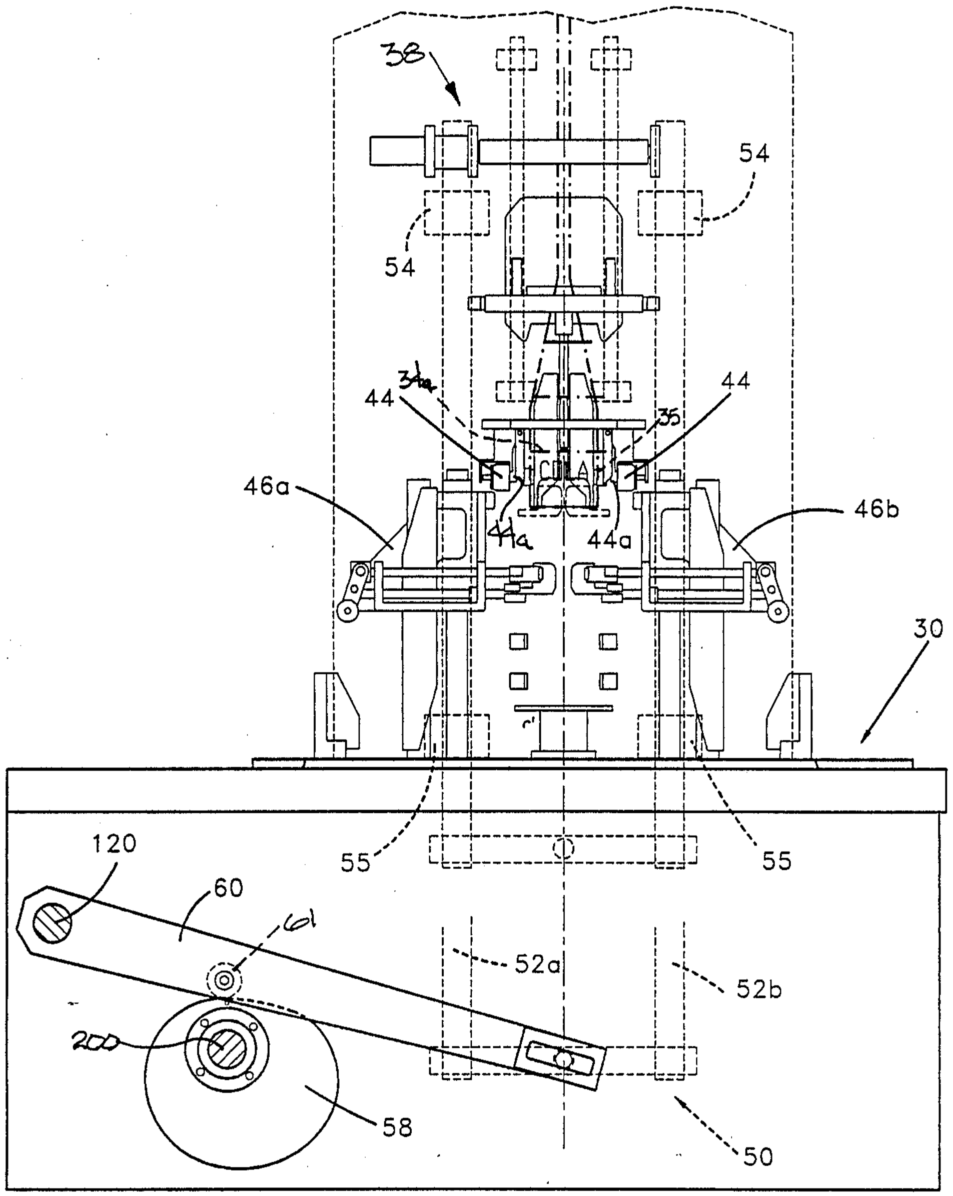
FIG. 5 is a fragmentary front view of the labeling apparatus with exterior covers removed.

The label applying assembly 46 is reciprocally movable in a vertical plane by carriage 50 operatively connected to the drive system located in the base 30 of the apparatus. Referring to FIG. 5, the carriage 50 includes a pair of slide rods 52a, 52b that are slidably supported by upper and lower slide bearings 54, 55. Left and right hand halves 46a, 46b of the labeling applying assembly 46 are adjustably clamped to the left and right slide rods 52a, 52b, respectively.

Figure 4:
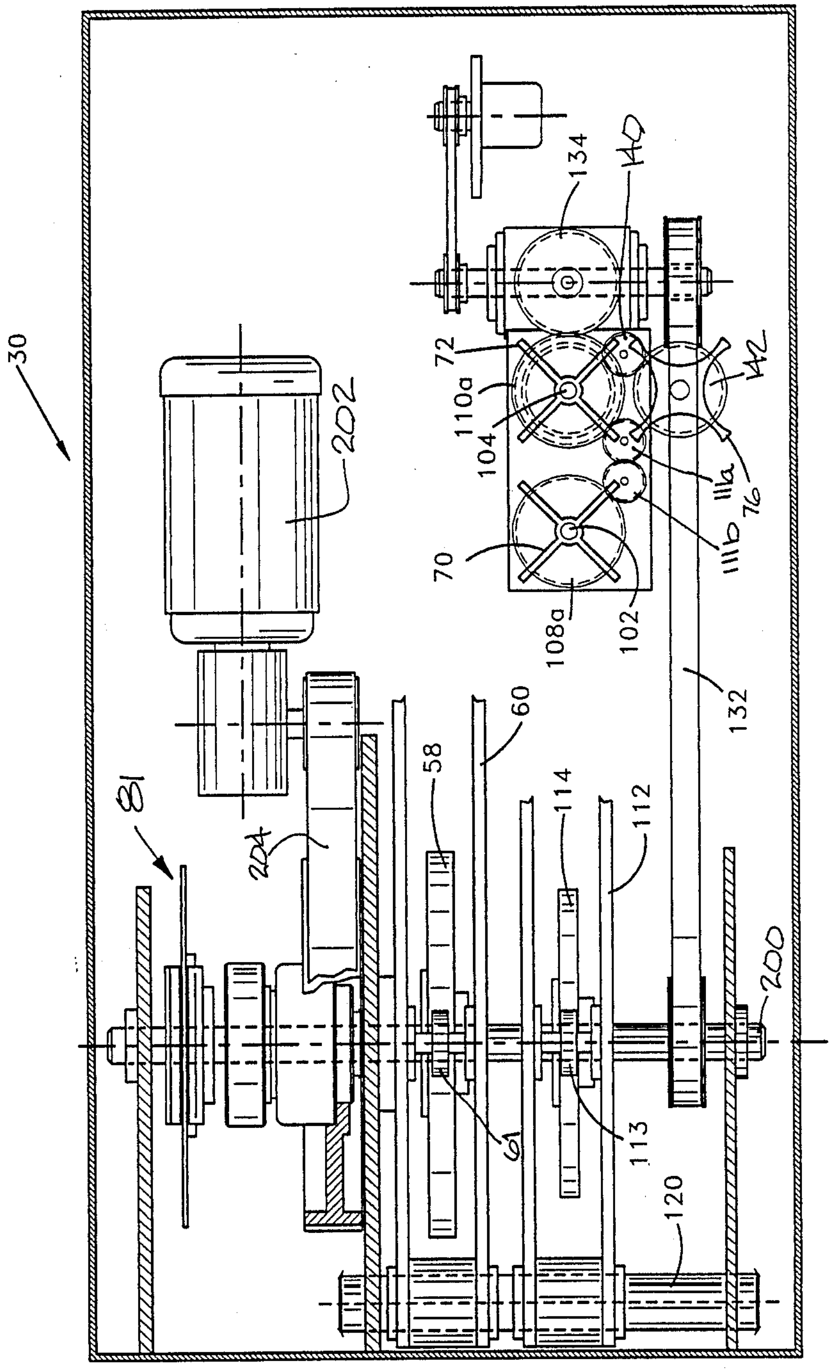
FIG. 4 is a sectional view as seen from the plane indicated by the line 4—4 in FIG. 3.

The drive system for the labeling assembly 46 is preferably similar to the drive system shown in U.S. Pat. No. 4,620,888, which has been incorporated by reference. As seen in FIGS. 4 and 5, the drive includes a power driven cam 58 which drivingly engages an operating arm 60 (via cam follower 61) pivoted at a pivot point 120 defined by the base. The cam 58 is mounted to a shaft 200 which is driven by a motor 202 by means of a drive belt 204. Rotation of the cam 58 causes vertical, reciprocal motion in the slide rods 52a, 52b and hence the labeling assembly 46.

Figure 6:
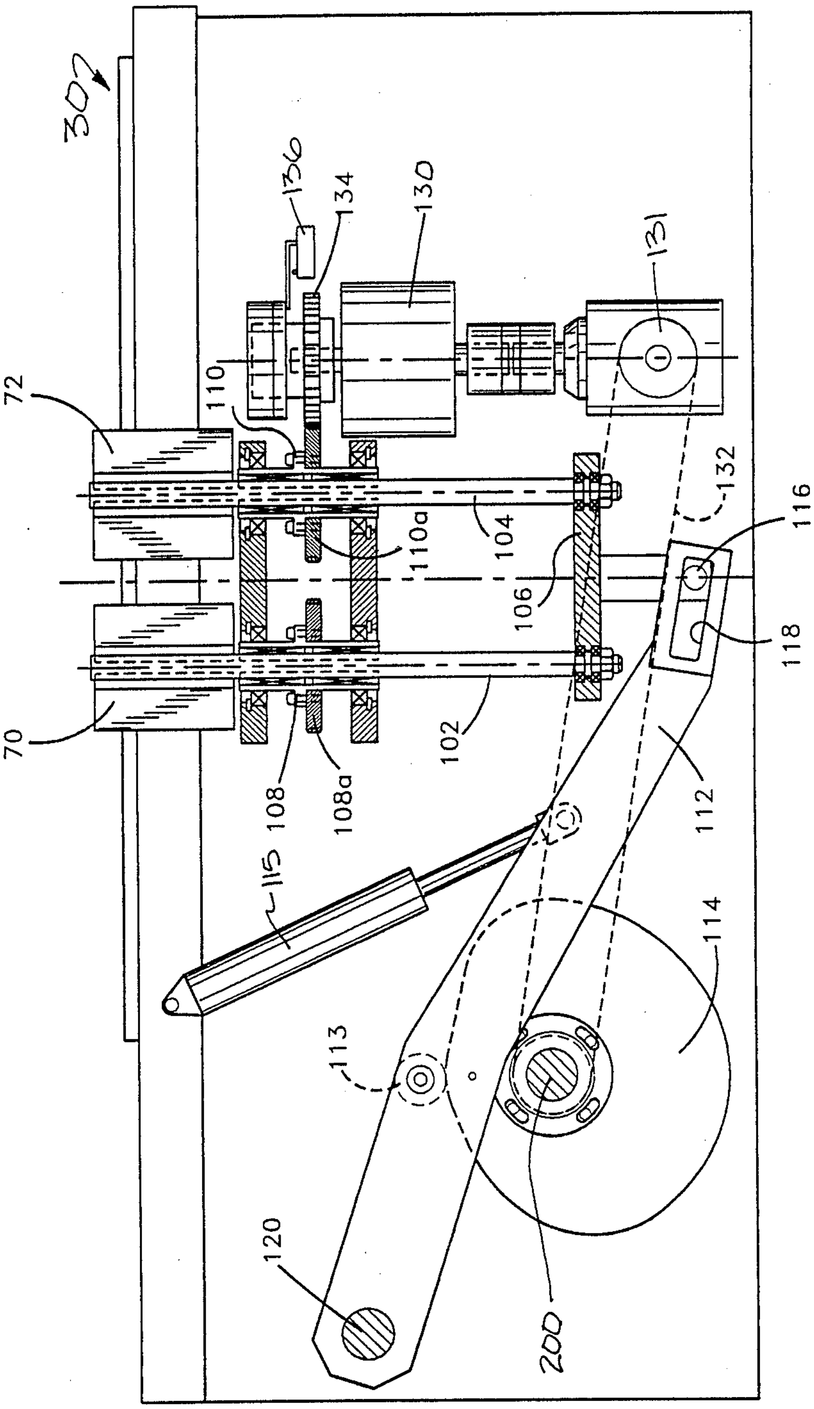
FIG. 6 is a fragmentary front view of the lower portion of the apparatus showing a container advancing mechanism constructed in accordance with a preferred embodiment of the invention.
Figure 7:
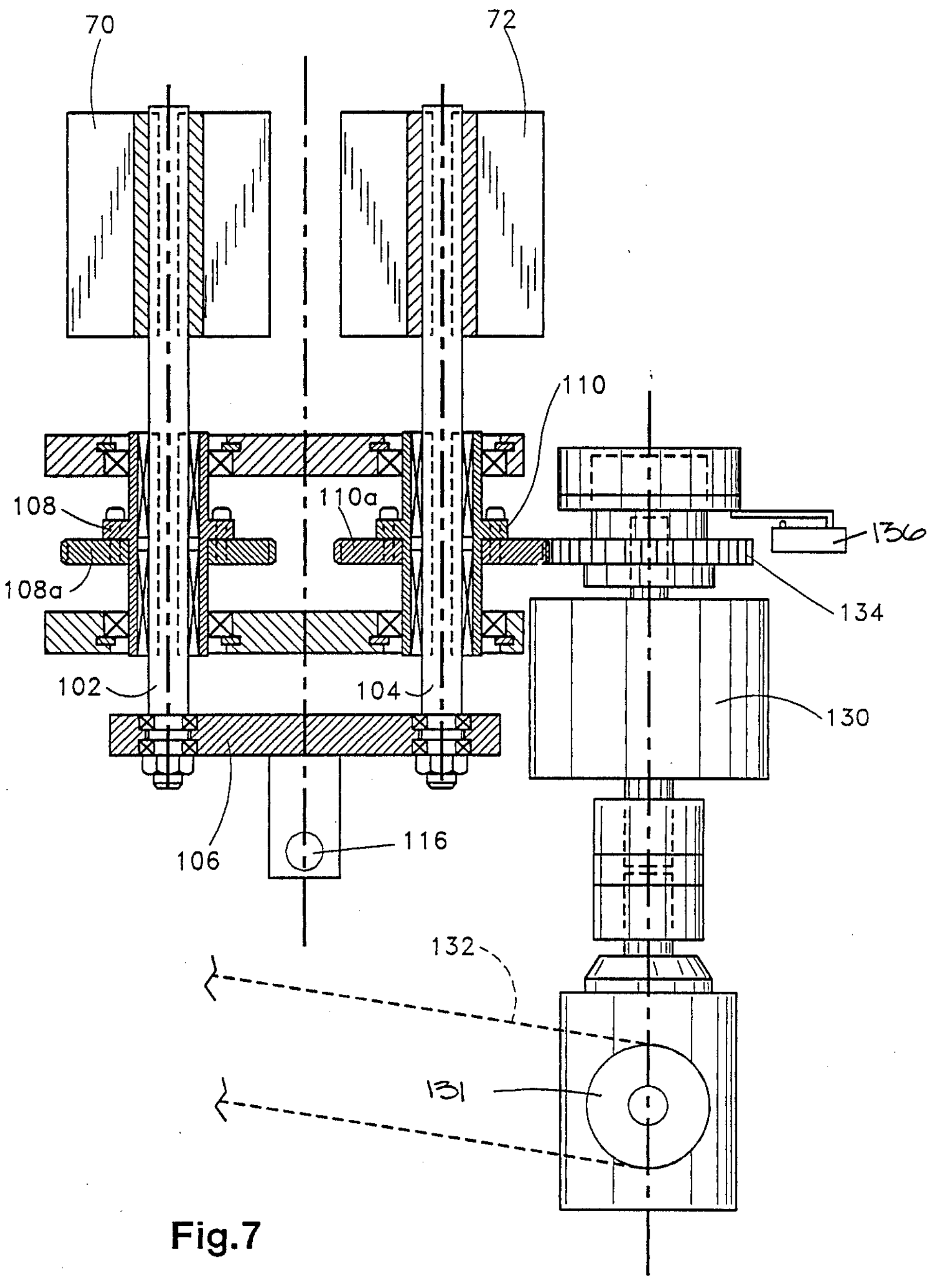
FIG. 7 is an enlarged fragmentary view of the container advancing mechanism.

Referring to FIGS. 4, 6 and 7, bottles to be labeled are advanced into the labeling position by the product advancing mechanism 26. In the preferred and illustrated embodiment, the bottle advancing and stabilizing apparatus includes a pair of reciprocally mounted paddle-like star wheels 70, 72. In the preferred and illustrated embodiment, the product advancing mechanism also includes an infeed star wheel 76 and a cooperating guide 78. The star wheel 76 advances a container from an entry conveyor to a bottle presenting position at which the paddle-like star wheels 70, 72 can engage the bottle and move it to the label applying position 28.

Figure 8B:
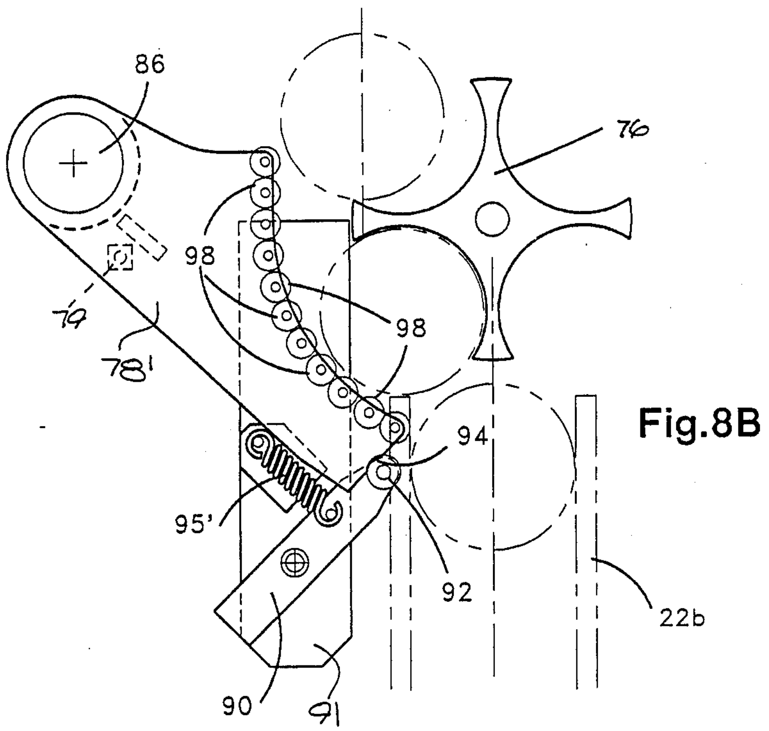
FIGS. 8A and 8B illustrate a guiding apparatus forming part of the present invention.
Figure 8A:
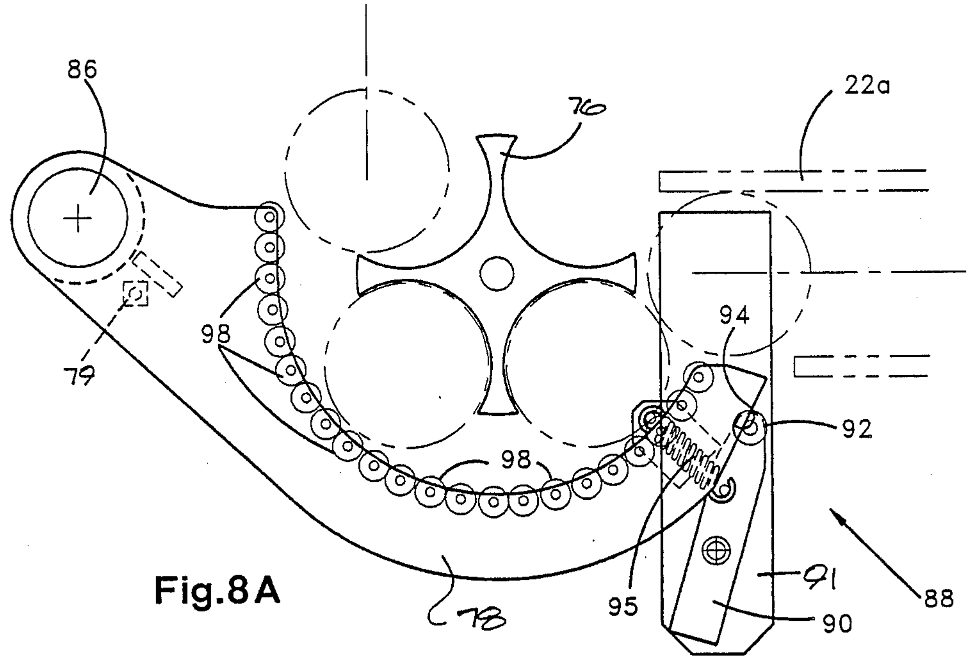
Figure 9:
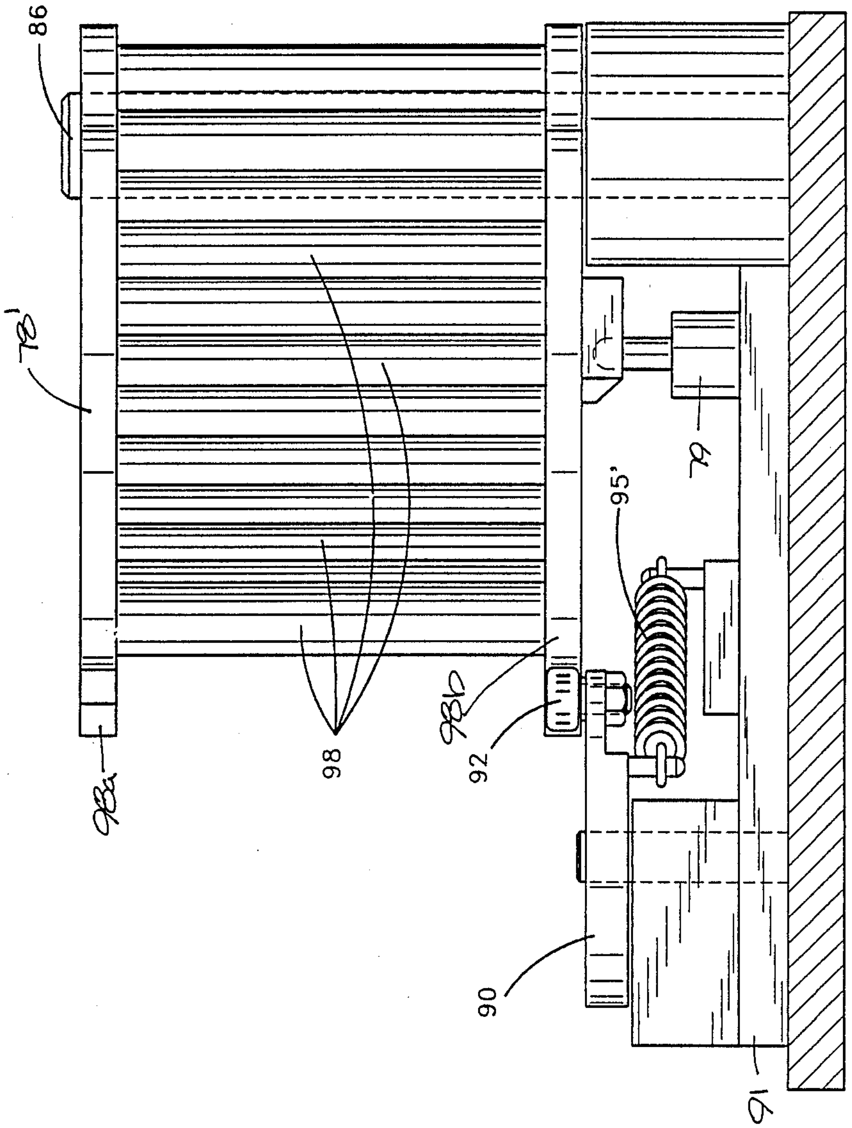
FIG. 9 is a side elevational view of the guide shown in FIG. 8B.

The infeed star wheel 76 and the guide 78 are adapted to receive containers from either a side conveyor 22a (see FIG. 1) or an inline conveyor 22b. Referring also to FIGS. 8A and 8B, when a side conveyor 22a is employed, the guide 78 comprises a substantially semi-circle shaped curved member (shown in FIG. 8A). When using an inline conveyor 22b, a smaller curved guide 78′ replaces the guide 78 that has an arc of approximately 90 degrees (see FIG. 8A).

In both configurations, the guide (whether it be guide 78 or guide 78′) is pivotally mounted to the machine on a pivot shaft 86. The opposite end of the guide is releasably held by a detent mechanism indicated generally by the reference character 88. In particular, the detent mechanism includes a spring loaded lever 90 having a roller 92 biased towards engagement with a detent notch 94 defined on the guide 78 by a tension spring 95. A similar arrangement is used with the guide 78′. Both guides include a plurality of vertically disposed rollers 98 rotatably supported between top and bottom frame plates 99a, 99b. The rollers 98 facilitate movement of the container as the star wheel 76 is rotated.

The detent mechanism 88 provides a malfunction sensor. In the event of a product jam in the vicinity of the star wheel 76, the guide 78 is forced out of the detent engaged position. An electrical switch 79 monitors movement and/or the position of the lever 90 or the guide 78 (or 78′) and terminates operation of the apparatus when a change in position or movement is sensed. The labeling machine, as more fully described in U.S. Pat. No. 4,620,888, may include a brake mechanism 81 (see FIG. 4) for arresting motion in the drive system virtually instantaneously upon sensing a malfunction.

The detent mechanism including the spring loaded arm 90, the roller 92 and the spring 95 are mounted to a base member 91. When switching between guide members 78 and 78′, the base member 91 is moved laterally with respect to the pivot 86 in order to engage the appropriate guide arm. The change in position of the base member 91 is clearly shown in FIGS. 8A and 8B. A conventional mounting arrangement for the base member is provided in the machine (not shown).

Returning to FIGS. 4, 6 and 7, the drive mechanism for the star wheels 70, 72 is illustrated. The star wheels are mounted at the upper ends of rotatable slide shafts 102, 104. The lower ends of the slide shafts are rotatably coupled to a tie bar 106 which maintains the spacial distance between the slide shafts 102, 104 while allowing rotation of the shafts. Each slide shaft 102 passes through an associated bearing/drive gear assembly 108, 110. Preferably, each the shaft 102, 104 is splined to the inside of its associated assembly. With the disclosed construction, rotation of the associated drive hub rotates the associated shaft while allowing the shaft to slide vertically through the hub.

The tie bar 106 is operatively connected to an arm 112 which includes a cam follower 113 that rides on a drive cam 114. The arm 112 is biases towards the cam 114 by a pressurized actuator or cylinder 115. The engagement between the cam 114 and cam follower 113 is monitored. If separation is sensed as would occur due to a jam, the drive system is deactivated. The tie bar 106 is coupled to the drive arm 112 by means of a slot/pin engagement. In particular, a pin 116 forming part of the tie bar 106 extends through a slot 118 formed at a distal end of the arm 112. The arm is pivoted at a pivot 120. When the drive cam 114 is rotated, the arm 112 and hence the tie bar 106 is reciprocated vertically.

In the preferred embodiment, the star wheels 70, 72 are intermittently rotated 90° by intermittent transmission 130. Such a transmission is available from CycloIndex Corporation and is sold under Model No. 2410-AV-90-1/4. The disclosed transmission 130 converts continuous rotary motion as conveyed to an input gear 131 by a chain 132 from the drive system, to intermittent rotary motion in a output drive gear 134. The output gear 134 rotates 90 degrees and then dwells for 270 degrees.

The drive gear 134 is connected to a gear operatively connected to the hub assembly 110 of the star wheel 72 which includes a gear 110a. The gear 110a is coupled to a gear 108a forming part of the hub assembly 108 of the star wheel 70 by means of a pair of idler gears 111a, 111b (shown in FIG. 4). This interconnection produces synchronized, concurrent rotation in the star wheels 70, 72 when the output gear 134 rotates.

In FIG. 6, the star wheels 70, 72 are shown in a lowered position which they assume near the end of the label applying cycle. As the label applying assembly 46 moves downwardly to apply a label to a container located at the label applying position 28, the star wheels 70, 72 move downwardly to provide clearance for the gripper assemblies 46a, 46b (see FIG. 3). In the preferred and illustrated embodiment, the drive cam 114 for controlling movement in the star wheels 70, 72 is configured such that movement in the star wheels toward the lower position shown in FIG. 6, does not begin until the label applying assembly 46 initially contacts the container located at the label applying position 28. Once downward movement is initiated in the star wheels 70, 72, movement in the label applying assembly 46 and the star wheels 70, 72 occurs substantially in unison. With the disclosed construction, the stability of the container at the label applying position is maintained for a greater interval of time thus inhibiting misalignment between the container being labeled and the label applying assembly.

According to a feature of this invention, the drive gear 134 includes a clutch mechanism which automatically declutches or decouples the transmission 130 from the star wheels should excessive torque be encountered. The clutch mechanism includes a sensor switch 136 (shown in FIG. 6) for terminating or arresting motion in the drive system if excessive torque is encountered. A brake mechanism as described above may also be activated to arrest motion in the drive system virtually instantaneously.

In the preferred and illustrated embodiment the infeed star wheel 76 is codriven with the star wheels 70, 72 but does not reciprocate vertically since it is located out of a path of movement of the label gripping assemblies 46. Referring to FIG. 4, an idler gear 140 couples the star wheel 72 to a gear 142 forming part of or attached to, the star wheel 76. The cams and drive system are synchronized so that the label applying assembly and star wheels are vertically reciprocated in a synchronized relationship. In addition, the intermittent transmission is synchronized so that the star wheels 70, 72 and infeed star wheel 76 are intermittently rotated to advance a container from a product presenting position into the label applying position when the label applying assembly 46 is in the raised position. With the disclosed construction, the drive motor 202 continuously drives the main drive shaft 200 to which the cams 58, 114 are mounted and which drives the intermittent transmission via the chain 132. Thus continuous actuation of the drive motor 200 produces reciprocating, synchronized motion in the label applying assembly 46 and star wheels 70, 72 while at the same time producing intermittent rotation of the infeed star wheel and paired star wheels 70, 72 to effect advancement of a bottle or other product from an input conveyor to the label applying position 28 defined at the labeling station.

It should also be noted that as a container is advanced to the label applying position 28, a container already at that position and labeled is then pushed onto the exit conveyor assembly 29 by the rotation of the star wheels 70, 72.

Figure 10:
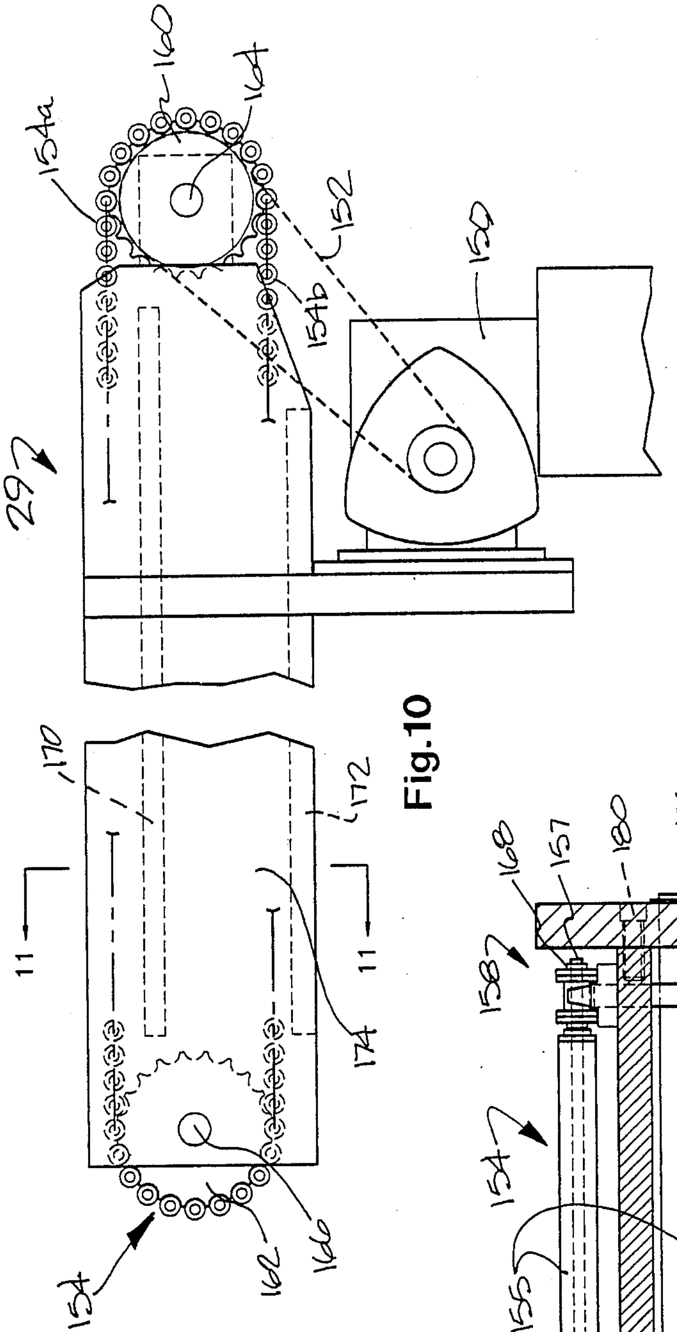
FIG. 10 is a side fragmentary view of an exit conveyor forming part of the apparatus; and, FIG. 11 is a sectional view as seen from the plane indicated by the line 11—11 in FIG. 10.
Figure 11:
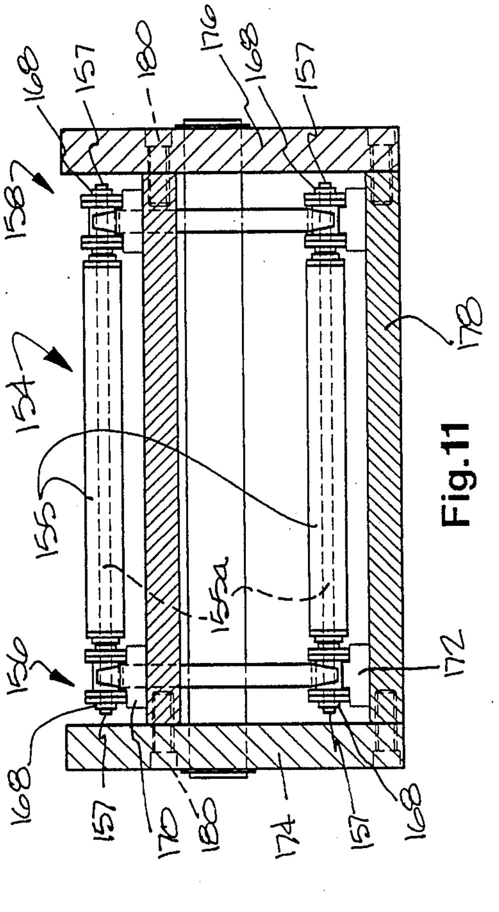

Turning now to FIGS. 10 and 11, the construction of the exit conveyor assembly 29 is illustrated. In the preferred embodiment, the exit conveyor is power driven by a motor including a gearbox 150 through a chain 152. The exit conveyor assembly includes a continuous chain of rollers 154 having an upper run 154a and a lower run 154b. The chain of rollers comprises a pair of spaced apart, side-by-side chains 156, 158 reeved around associated sprockets 160, 162. The sprockets 160 are attached to a common shaft 164 which is driven by the chain 152 by means of an outboard sprocket (not shown). The other sprockets 162 constitute idler sprockets and our rotatably coupled to, or supported by an idler shaft 166.

The chain of rollers includes a plurality of individual rollers 155 that are each rotatably supported on an associated shaft 155a. Each shaft 155a spans the chains 156, 158 and is held between individual chain links of the chains. The chain links include hollow pins which are adapted to receive ends 157 of the shaft 155a. The shafts 155a are held in position by retainers 168 mounted at the opposite ends 157 of the shaft 155a. The upper and lower runs 154a, 154b of the chains are supported by guide blocks 170, 172, respectively. The guide blocks slidably support the chains while maintaining their alignment. The shafts 164, 166 that support the sprockets 160, 162, respectively are rotatably supported by side plates 174, 176 forming part of the exit conveyor assembly. A base plate 178 interconnects the side plates 174, 176. Suitable fasteners 180 secure the assembly together.

With the disclosed construction, containers exiting the labeling station are allowed to move at a rate greater than the velocity of the conveyor. In particular, the conveyor is preferably continuously moving to transport labeled products from the product labeling machine to another location. A labeled container that is pushed out of the labeling station normally moves at a much more rapid rate than the conveyor velocity. The rolls 155 allow the container to easily move onto the conveyor (under the action of the star wheels 70, 72) even though the conveyor itself is moving at a slower linear speed. With the disclosed conveyor, transport of the label products from the machine are facilitated.

Although the invention has been described with a certain degree of particularity, it should be understood that those skilled in the art can make various changes to it without departing from the spirit or scope of the invention as herein after claimed.

We claim:

1. In a labeling apparatus having a labeling assembly for applying sleeve labels to products, a product advancing mechanism comprising:

(a) a pair of intermittently rotatable product advancing members for advancing a product from a product presenting position to a label applying position;

(b) said product advancing members including product engaging elements arranged such that when said product is in said label applying position, said product is located by confronting product engaging elements of said product advancing members;

(c) member support means defining a pair of laterally spaced and substantially parallel axes of rotation for said advancing members;

(d) means for reciprocally moving said advancing members along a path substantially parallel to said axes of rotation of said advancing members to provide clearance for said labeling assembly as said labeling assembly moves through a label applying path of movement during a label applying cycle;

(c) means for synchronizing rotation and reciprocal movement of said product advancing members with said label applying assembly.

2. The apparatus of claim 1 wherein said rotation for synchronizing includes a drive system including a first cam drive for said label applying assembly and a second cam drive for said product advancing members.

3. The apparatus of claim 1 wherein said rotation of said product advancing members is provided by an intermittent transmission having a continuously rotatable input member driven by a main drive system.

4. The apparatus of claim 1 further including a star wheel infeed member and an associated guide means for advancing a product to be labeled from a conveyor to the product presenting position.

5. The labeling apparatus of claim 1, wherein said member support means comprises a pair of laterally spaced, elongate drive shafts to which said product advancing members are mounted, said shafts being co-rotated intermittently by an intermittent transmission means including drive hub means, slidably receiving said shafts, such that said shafts can reciprocate relative to said drive hub means while being rotated by said transmission means.

6. The labeling apparatus of claim 1, including means for delaying movement in said advancing members until said labeling assembly reaches a predetermined position with respect to a product at said label applying position, whereby said advancing members operate to stabilize said product at said label applying position for at least a portion of said label applying cycle.

7. The labeling apparatus of claim 6, wherein said means for delaying movement includes a cam drive mechanism for effecting said reciprocal movement in said advancing members.

8. The labeling apparatus of claim 1, wherein said label applying assembly and product advancing members are reciprocally driven through said label applying cycle by first and second cams, respectively, mounted to a common shaft, said second cam being configured such that movement in said product advancing members is delayed until said labeling assembly reaches a predetermined position with respect to a product located at said label applying position.

9. In a labeling apparatus having a labeling assembly for applying sleeve labels to products a product advancing mechanism comprising:

(a) a pair of intermittently rotatable product advancing members for advancing a product from a product presenting position to a label applying position;

(b) means for reciprocally moving said advancing members to provide clearance for said labeling assembly as said labeling assembly moves through a label applying path of movement;

(c) means for synchronizing rotation and reciprocating movement of said product advancing members with said label applying assembly; and, (d) a star wheel infeed member and an associated guide means for advancing a product to be labeled from a conveyor to the product presenting position, said guide means being adjustable to enable said infeed star wheel to advance a product from either an inline conveyor or a side conveyor.

10. In a labeling apparatus having a labeling assembly for applying sleeve labels to products a product advancing mechanism comprising:

(a) a pair of intermittently rotatable product advancing members for advancing a product from a product presenting position to a label applying position;

(b) means for reciprocally moving said advancing members to provide clearance for said labeling assembly as said labeling assembly moves through a label applying path of movement;

(c) means for synchronizing rotation and reciprocating movement of said product advancing members with said label applying assembly;

(d) a star wheel infeed member and an associated guide means for advancing a product to be labeled from a conveyor to a product presenting position; and, (e) detent means forming part of said guide means for detecting a malfunction in advancement of a product including means for terminating operation of said labeling apparatus upon sensing a malfunction.

11. In a labeling apparatus having a labeling assembly for applying sleeve labels to products a product advancing mechanism comprising:

(a) a pair of intermittently rotatable product advancing members for advancing a product from a product presenting position to a label applying position;

(b) means for reciprocally moving said advancing members to provide clearance for said labeling assembly as said labeling assembly moves through a label applying path of movement;

(c) means for synchronizing rotation and reciprocating movement of said product advancing members with said label applying assembly; and, (d) torque sensing means for said advancing members operative to terminate operation of the labeling apparatus upon sensing excessive drive torque in said advancing members.

12. In a labeling apparatus having a labeling assembly for applying sleeve labels to products a product advancing mechanism comprising:

(a) a pair of intermittently rotatable product advancing members for advancing a product from a product presenting position to a label applying position;

(b) means for reciprocally moving said advancing members to provide clearance for said labeling assembly as said labeling assembly moves through a label applying path of movement;

(c) means for synchronizing rotation and reciprocating movement of said product advancing members with said label applying assembly; and (d) exit conveyor means including a continuous chain of rollers rotatably supported between a pair of chains such that said rollers are operative to allow products being conveyed by said conveyor means to move at a velocity greater than the linear speed of said conveyor.

13. The apparatus of claim 12 wherein said rollers are rotatably supported by shafts that extend between and are by laterally spaced, opposed chain links of said chains.

14. A method for labeling tubular product containers with a tubular sleeve, comprising the steps of:

(a) advancing a product to be labeled to a product presenting position using a conveyor means;

(b) engaging said container at said product presenting position with a pair of star wheels located in a confronting relationship;

(c) holding said product to be labeled in a pocket defined by confronting members of said star wheels;

(d) waiting until a label applying assembly initially contacts said product to be labeled and then moving said star wheels to provide clearance for said label applying assembly; and, (e) moving said labeled product out of said label applying position.

15. The method of claim 10 further comprising the step of advancing a product container from a conveyor to a product presenting position using a star wheel.

* * * * *